2,740,770
Patented Apr. 3, 1956

2,740,770

METHOD FOR PREPARING INTERPOLYMERS OF VINYLIDENE CYANIDE WITH ALIPHATIC CONJUGATED DIOLEFINS

Harry Gilbert, Cuyahoga Falls, and Floyd F. Miller, Wadsworth, Ohio, assignors to The B. F. Goodrich Company, New York, N. Y., a corporation of New York No Drawing. Application March 31, 1953,
Serial No. 346,042

11 Claims. (Cl. 260—78.5)

This invention relates to a method for preparing interpolymers of vinylidene cyanide with aliphatic conjugated diolefins and pertains particularly to the preparation of such interpolymers by carrying out the polymerization in the presence of a catalyst mixture comprising an inorganic acid and an organic thiol.

U. S. Patents 2,615,872 and 2,615,873 disclose methods for preparing copolymers of vinylidene cyanide and aliphatic conjugated diolefins. Disclosed therein is the characteristic of vinylidene cyanide to polymerize on contact with water and instantaneously form the resinous homopolymer. It is also disclosed therein that vinylidene cyanide and the aliphatic conjugated diolefins exhibit a very strong tendency to react in such a manner as to form a Diels-Alder adduct, and that this reaction always competes very strongly with the polymerization reaction. As a result of this competing reaction, the polymerization often proceeds slowly, and only relatively small conversions of monomers to polymer are obtained, with the adduct formation consuming a considerable quantity of the monomers before polymerization can occur.

Accordingly, it is an object of the present invention to provide a process for preparing interpolymers containing vinylidene cyanide and aliphatic conjugated dienes whereby high conversions of monomers to polymer are obtained.

It is another object of this invention to provide catalysts which accelerate the polymerization of monomeric mixtures containing vinylidene cyanide and aliphatic conjugated dienes to such a degree that polymerization of substantially all the monomers occurs before Diels-Alder adduct formation can occur in a significant amount. Other objects will be apparent from the description which follows.

It has now been discovered that the above and other objects are readily attained by polymerizing monomeric mixtures containing vinylidene cyanide and aliphatic conjugated dienes in the presence of an inoragnic acid and an organic thiol. By carrying out the polymerization in this manner, adduct formation is negligible and nearly quantitative yields of polymer are obtained. Moreover, the polymerization time is greatly decreased so that the present process is operated much more economically than the same polymerization utilizing conventional polymerization catalysts such as organic peroxides, diazo compounds, and the like.

The unique process of the present invention may be utilized in preparing all copolymers of vinylidene cyanide with aliphatic conjugated diolefins, as well as interpolymers containing three or more monomeric constituents, at least two of which are vinylidene cyanide and an aliphatic conjugated diolefin. For example, the combination of an inorganic acid and an organic thiol is effectively utilized to catalyze the polymerization of vinylidene cyanide with such aliphatic conjugated dienes as butadiene-1,3, isoprene, piperylene, 2,3-dimethyl butadiene-1,3, 1,2-dimethyl butadiene-1,3, 1-ethyl-butadiene-1,3, phenyl butadiene, 2-neopentyl butadiene-1,3, 2-methyl-pentadiene-1,3, 2-chlorobutadiene-1,3, 2-bromo-butadiene-1,3, 1-bromo-2-methylbutadiene, 1-iodo-3-methyl-butadiene-1,3 and the like.

The process of this invention may also be utilized in the preparation of interpolymers containing vinylidene cyanide, a diolefin of the type disclosed hereinabove, and one or more other polymerizable materials which may be a vinyl or vinylidene compound, an aliphatic conjugated diene, a vinyl ester, a vinyl halide, an acrylic or methacrylic acid ester, an allyl ester, styrene or a substituted styrene, acrylonitrile, a monoolefinic hydrocarbon such as isobutylene, 1,2-dihaloethylenes or the like, as well as other polymerizable materials. Preferably, the third monomer, if one is utilized, contains a terminal methylene group ($CH_2$) attached by a double bond to a second carbon atom, that is, it possesses the $CH_2\!=\!C\!<$ group. The process has been found to be particularly useful in polymerizing a monomeric mixture consisting of vinylidene cyanide, butadiene-1,3 and styrene, and also a monomeric mixture consisting of vinylidene cyanide, butadiene-1,3, and a second aliphatic conjugated diene such as isoprene or the like.

Any organic thiol (mercaptan), that is, any compound of the structure RSH, wherein R is an organic radical, may be utilized as the thiol component of the catalyst mixture of the present invention. The thiol may be a primary, secondary or tertiary compound. Included within this class of compounds are aromatic thiols such as benzenethiol (thiophenol), naphthalenethiols such as 2-naphthalenethiol (thionaphthol), 8-quinolinethiol, 3-methyl cyclohexanethiol, o-, m- and p-toluenethiols (thiocresols), xylenethiols, alpha-toluenethiol, and the like; and aliphatic thiols such as methanethiol, ethanethiol, 1-propanethiol, 1-butanethiol, 2-butanethiol, 1-hexanethiol, dodecanethiol, 2-mercaptoethanol, gamma-mercapto-alpha beta-dimethyl butyric acid and the like. It is to be understood that the above compounds represent but a few of the organic thiols which may be utilized, since any of the generic class of organic thiols are operative in the process of the present invention. Those thiols most useful are those which do not contain strongly ionizable substituents such as an amine. A preferred group includes those wherein R is an alkyl or aryl hydrocarbon radical. The aromatic thiols form a more preferred class of thiols for use in this invention. Mixtures of thiols are particularly useful.

Likewise, any of the generic class of strong inorganic acids, which are well known, may be utilized in combination with organic thiols to catalyze vinylidene cyanide-diene polymerizations. Included within this class are concentrated sulfuric acid and oleum, hydrogen halides such as hydrogen chloride, concentrated nitric and phosphoric acid, halosulfonic acids such as chlorosulfonic acid and the like. Preferred are the hydrogen halides. More preferred is hydrogen chloride.

The organic thiol and the inorganic acid can be admixed and stored in this form for long periods of time without destroying the effectiveness of the catalyst mixture; accordingly, the catalyst mixture can be conveniently prepared in advance and utilized when needed.

The respective quantities of the organic thiol and the inorganic acid utilized are subject to wide variation. The function of the mixture of the thiol and the inorganic acid is that of a catalyst or initiator, and consequently any catalytic quantity may be used. For example, amounts as small as 0.01% or even less of each component based on the total weight of monomers or larger amounts of 5% or more may be utilized, the larger amounts being preferably used in systems where the polymerization ordinarily proceeds quite slowly. It is generally preferred to keep the concentration of the acid component below 5%. A useful range is between 0.1 to about 5.0% of the two components.

Polymerization utilizing the catalysts of the present invention may be carried out in any of the various manners utilized in liquid phase polymerizations. One preferred method consists in admixing the monomers in a solvent such as benzene, toluene, trichlorobenzene or other liquid aromatic hydrocarbons, and adding the catalyst mixture, whereupon polymerization occurs to form the desired polymer. The polymerization may be carried out in aliphatic solvents such as hexane or heptane wherein the polymer separates as it forms. The polymerization may also be carried out in mass, that is, simply by admixing the monomers with the catalyst mixture in the absence of solvent media and/or other materials. It is important when utilizing any of the above methods of polymerization that the polymerization mixture be free from impurities such as water, amines and the like, which initiate the ionic homopolymerization of vinylidene cyanide, that is, the polymerization should be carried out in a non-ionic medium.

The polymerizations are usually carried out at room temperatures. However, polymerization by the method of this invention also occurs quite readily at temperatures as low as $-50°$ C. or even lower; in fact, it is desirable to operate the process at low temperatures, since the reaction rate of the competing Diels-Alder reaction is very slow at temperatures below about $0°$ C. Higher temperatures, for example as high as $100°$ C. or even higher, may be utilized provided suitable equipment is utilized.

The following examples, in which parts are by weight, unless otherwise specified, are illustrative of the process of this invention, but are not intended to limit the scope thereof for there are, of course, numerous possible variations and modifications.

EXAMPLES I TO VIII

A solution is prepared by dissolving 12.7 parts of butadiene-1,3, 9.0 parts of styrene and 10 parts of a 10% solution of para thiocresol in benzene in 140 parts of benzene. 20 parts of this solution are then placed in each of eight polymerization tubes. 2.5 parts of vinylidene cyanide are then added to each of the tubes together with varying amounts of hydrogen chloride whereupon polymerization occurs to form a vinylidene cyanide, butadiene-1,3, styrene tripolymer. The quantity of acid added, the polymerization temperature and conversion to tripolymer after 18 hours are recorded in Table I below:

Table I

|  | I | II | III | IV | V | VI | VII | VIII |
|---|---|---|---|---|---|---|---|---|
| Polymerization temperature (° C.) | 20 | 20 | 20 | 20 | 20 | 20 | 0 | 0 |
| Hydrochloric acid (ml.) (2% HCl in benzene)[1] | 0 | 0.72 | 1.5 | 4.0 | 8.0 | 12.0 | 1.5 | 12.0 |
| Percent conversion to tripolymer | 27 | 71.3 | 79.5 | 81.0 | 81.0 | 77.4 | 83 | 84.3 |

[1] In each example, additional benzene is initially added so that the total volume of the reaction mixtures is the same.

EXAMPLES IX AND X 8.2 parts butadiene-1,3, 6.0 parts styrene, 13.8 parts vinylidene cyanide and 6 parts of a thiocresol solution (10% thiocresol in benzene) are dissolved in 180.0 parts of benzene. 25 ml. of this solution are then placed in each of two polymerization tubes and 0.3 ml. of oleum is added to one tube, and 3.0 ml. of oleum are added to the second tube. High conversions to an excellent tripolymer are obtained after maintaining the mixtures at $20°$ C. for 18 hours with the conversion in the second tube being higher than that in the tube containing the smaller quantity of oleum.

EXAMPLE XI 8.2 parts of butadiene-1,3 are dissolved in 142 parts of benzene. 32 ml. of the solution are then admixed with 1.2 ml. of styrene, 9.8 ml. of a 24% vinylidene cyanide solution in benzene, 1.0 ml. of an 0.8% solution of chlorosulfonic acid in benzene and 1.3 ml. of a 10% thiophenol solution in benzene. The resulting mixture is maintained at $20°$ C. for 17 hours and an 80.2% conversion to tripolymer is obtained.

Excellent vinylidene cyanide-diene copolymers are also obtained by utilizing the inorganic acids and organic thiols as catalysts. Moreover, when the above examples are repeated utilizing other dienes instead of butadiene-1,3, other polymerizable monomers instead of styrene and other strong acids and thiols, useful polymeric materials are obtained.

The polymers prepared according to the process of the present invention have definite softening points and are extremely useful in the preparation of excellent filaments and films.

Although the invention has been described with reference to specific examples, it is not intended to limit the invention solely thereto, for numerous variations and modifications will be apparent to those skilled in the art and are included within the scope of the appended claims.

We claim:

1. The method which comprises polymerizing in the absence of water a mixture of monomeric materials, at least two of which are vinylidene cyanide and an aliphatic conjugated diene, in the presence of from 0.01 to 5.0% each of an organic thiol and a strong inorganic acid.

2. The method which comprises polymerizing in a non-ionic medium in the absence of water a mixture of monomeric materials, at least two of which are vinylidene cyanide and an aliphatic conjugated diene, in the presence of from 0.1 to 5.0% an aromatic thiol and a strong inorganic acid.

3. The method of claim 2 wherein the aromatic thiol is benzenethiol and the strong inorganic acid is hydrogen chloride.

4. The method of claim 2 wherein the aromatic thiol is a thiocresol and the strong inorganic acid is hydrogen chloride.

5. The method of claim 2 wherein the aromatic thiol is a thionaphthol and the strong inorganic acid is hydrogen chloride.

6. The method which comprises polymerizing in a non-ionic medium in the absence of water a mixture of monomeric materials, at least two of which are vinylidene cyanide and an aliphatic conjugated diene, in the presence of 0.1 to 5.0% an aliphatic organic thiol and a strong inorganic acid.

7. The method of claim 6 wherein the aliphatic organic thiol is tertiary-butylthiol and the strong inorganic acid is hydrogen chloride.

8. The method which comprises preparing in a non-ionic water-free medium a monomeric mixture consisting essentially of vinylidene cyanide, butadiene-1,3, adding to said mixture from 0.1 to 5.0% of hydrogen chloride and thiocresol, whereupon polymerization occurs to form an interpolymer of said vinylidene cyanide and butadiene-1,3.

9. The method which comprises preparing in a non-ionic water-free medium a monomeric mixture consisting essentially of vinylidene cyanide, butadiene-1,3 and styrene, adding to said mixture from 0.1 to 5.0% of hydrogen chloride and thiocresol, whereupon polymerization occurs to form an interpolymer of said vinylidene cyanide, butadiene-1,3 and styrene.

10. The method which comprises preparing in a non-ionic water-free medium a monomeric mixture consisting essentially of vinylidene cyanide, butadiene-1,3 and styrene, adding to said mixture from 0.1 to 5.0% of concentrated sulfuric acid and thiocresol, whereupon polymerization occurs to form an interpolymer of said vinylidene cyanide, butadiene-1,3 and styrene.

11. The method which comprises preparing in a non-ionic water-free medium a monomeric mixture consisting essentially of vinylidene cyanide, butadiene-1,3 and another conjugated aliphatic diene, adding to said mixture from 0.1 to 5.0% of hydrogen chloride and thiocresol, whereupon polymerization occurs to form an interpolymer of the three monomeric constituents.

References Cited in the file of this patent

UNITED STATES PATENTS

| | | |
|---|---|---|
| 2,281,613 | Wollthan et al. | May 5, 1942 |
| 2,383,055 | Fryling | Aug. 21, 1945 |